US012135145B2

(12) United States Patent
Gammon et al.

(10) Patent No.: US 12,135,145 B2
(45) Date of Patent: *Nov. 5, 2024

(54) MOVABLE VENTILATION SYSTEM

(71) Applicant: Adam Cornish, Collingwood (AU)

(72) Inventors: Jock Thurgood Gammon, Banksmeadow (AU); Adam Cornish, Collingwood (AU)

(73) Assignee: Adam Cornish, Collingwood (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,692

(22) Filed: May 30, 2023

(65) Prior Publication Data

US 2023/0383969 A1 Nov. 30, 2023

Related U.S. Application Data

(63) Continuation of application No. 16/634,471, filed as application No. PCT/AU2018/050786 on Jul. 27, 2018, now Pat. No. 11,767,995.

(30) Foreign Application Priority Data

Jul. 28, 2017 (AU) ................. 2017902974

(51) Int. Cl.
 *F24F 8/10* (2021.01)
 *F24F 8/175* (2021.01)
 *F24F 13/08* (2006.01)
 *F24F 13/28* (2006.01)

(52) U.S. Cl.
 CPC .............. *F24F 8/10* (2021.01); *F24F 13/085* (2013.01); *F24F 13/28* (2013.01); *F24F 8/175* (2021.01)

(58) Field of Classification Search
 CPC ........ A01G 9/025; F24F 13/085; F24F 13/28; F24F 8/10; F24F 8/175
 USPC ............................................... 454/128; 47/83
 See application file for complete search history.

(56) References Cited

U.S. PATENT DOCUMENTS

| 5,397,382 A | 3/1995 | Anderson |
| 11,767,995 B2 * | 9/2023 | Gammon .................. F24F 8/10 454/284 |
| 2013/0118070 A1 | 5/2013 | Marquez |
| 2013/0227884 A1 | 9/2013 | Park et al. |

(Continued)

FOREIGN PATENT DOCUMENTS

| CN | 202958271 | 6/2013 |
| CN | 104566710 A | 4/2015 |

(Continued)

OTHER PUBLICATIONS

European Search Report and Opinion for Application No. 18838285.7 dated Apr. 4, 2021, 14 pages.

(Continued)

*Primary Examiner* — Vivek K Shirsat
(74) *Attorney, Agent, or Firm* — TraskBritt

(57) ABSTRACT

In one embodiment of the present invention, there is provided a moveable ventilation system comprising a supporting frame having at least one plenum, and at least one biofilter module mounted on the plenum for allowing air to flow through the biofilter module from an air inlet to an air outlet via a growth medium and a vegetation. The plenum is rotatably connected to the supporting frame.

32 Claims, 12 Drawing Sheets

(56) References Cited

U.S. PATENT DOCUMENTS

2014/0318012 A1 10/2014 Fujiyama
2015/0231548 A1 8/2015 Lin

FOREIGN PATENT DOCUMENTS

CN 104871860 A 5/2015
CN 204669975 9/2015
WO 2014/169707 A1 10/2014

OTHER PUBLICATIONS

International Search Report for Application No. PCT/AU2018/050786 dated Sep. 4, 2018, 6 pages.
International Written Opinion for Application No. PCT/AU2018/050786 dated Sep. 4, 2018, 7 pages.

* cited by examiner

MOVABLE VENTILATION SYSTEM

This application is a continuation of U.S. patent application Ser. No. 16/634,471, filed Jan. 27, 2020, which is a U.S. National Phase filing of International Application No. PCT/AU2018/050786, filed Jul. 27, 2018, which relates and claims priority to Australian Application No. 2017902974, filed Jul. 28, 2017, the entirety of each of which are hereby incorporated by reference in their entirety.

The present invention relates to a movable ventilation system, and, in particular, the present invention generally relates to a movable ventilation system for botanical biofilter.

BACKGROUND

Indoor air quality has become a growing concern. With a rapidly increasing shift towards greater urbanisation, a significant portion of population exposure to air pollutants occurs within an indoor environment. To address such problem, a lot of modern buildings have mechanical ventilation component of heating, ventilation and air conditioning (HVAC) systems to maintain indoor environmental quality.

Typical air filter used in these systems for filtering indoor ambient air pass the air through a filter media. Usually, the medium consists of a mineral or electrostatic type filter, or other absorbent organic or inorganic fibrous mat. However, typically these filtering systems either need to be repaired, replaced, cleaned or disassembled after a period of use. Also, this type of air filter is usually not aesthetically pleasing.

Botanical biofilter can efficiently absorb carbon dioxide and emit oxygen. Experiments have showing that properly configured botanical filter, especially those arranged in dense clusters, have been shown to be very good at absorbing particulate matter from the air and in general providing a cleaning effect to the environment whilst at the same time emitting oxygen as a by-product.

Applications for garden walls are evolving all of the time and in some cases for example on the exterior walls of a building or for example the outer wall of a multi-level car park where the said plant wall gardens are configured with the said plants on the outer surface of said building or said car park wall and in such a situation a problem arises in that maintenance personnel will not have ready access to the said plants for inspection and routine maintenance.

U.S. Pat. No. 5,397,382 discloses a bio regeneration air filter having a pot for holding a filtering media and plant. The filtering media traps contaminates from air circulated therethrough and microorganisms associated with the root system breaking down the contaminates to convert them to plant food whereby the filtering media regenerates and need not be replaced. Air intake tubes draw air to or force air through the filtering media and communicate with a motor driven fan located in a base assembly which is removable from the pot. The fan can push air upwardly through air intake tubes, or reversely, draw air downwardly through the air intake tubes, whereby in either direction to bring ambient indoor air through the filtering media for bio regeneration filtering to occur. The pot may have an integrally formed air chamber for the air intake tubes or the system may include a separate air pan assembly forming a chamber below the pot and between the pot and the fan in the base. Although, these bio regeneration air filters were easy to access and maintain, they took up much of the valuable living space of the habitant.

US Patent Published Application No. 20130227884 discloses a port for a vertical wall. The port has a port body having first and second connecting bars connected to each other at a predetermined angle to have an interior space filled with soil, and having a plurality of body filter holes on one surface. The port also has a cover configured to shield the interior space of the port body by connecting first and second connecting bars at a predetermined angle, having cover filter holes at locations corresponding to the body filter holes, and having vegetation holes through which plants pass between the cover filter holes. The port comprises multi-filters passing through the soil filled in the interior space, the body filter holes of the port body, and the cover filter holes of the cover to purify suctioned interior air while the interior air passes the multi-filters. However, this prior art air filter was typically difficult to install and maintain.

US Patent Published Application No. 20150231548 discloses an air cleaning device includes a body, a deflector, a filter material and a fan module. The body includes a first opening, a second opening, and at least a first accommodating tank. The deflector is disposed above the first accommodating tank and divides an interior of the body into an air inlet portion and an air outlet portion, wherein the air inlet portion communicates with the first opening and the air outlet portion communicates with the second opening. The filter material is filled in the first accommodating tank. The fan module draws external air through the air inlet portion to pass through the filter material to enter the air outlet portion. Similarly, this prior art air cleaning device generally takes up much of the valuable living space of the habitant, when installed.

Therefore, it currently lacks an aesthetically pleasing botanical biofilter system that is easy to install and maintain while taking small amount of space of the inhabitant.

SUMMARY

It is an object for the present invention to provide a moveable ventilation system for botanical biofilter.

It is another object of the present invention to provide a moveable ventilation system for botanical biofilter for easy access when replacing and repairing.

It is another object of the present invention to provide an improvement of moveable ventilation system.

It is, therefore, an object of the present invention to provide a new and novel moveable ventilation system.

Other objectives and advantages will become apparent when taken into consideration with the following specification and drawings.

It is also an object of the present invention to overcome or ameliorate at least one of the disadvantages of the prior art, or to provide a useful alternative.

It is therefore an objection of the present invention to provide a moveable ventilation system 10 comprising
- a supporting frame having one or more plenum 14,
- one or more biofilter modules 18 mounting on the plenum 14;
- an impeller in the plenum for driving air through biofilter module 10 from an air inlet to an air outlet via a growth medium and a vegetation,
- wherein the air inlet 22 has one or more apertures directing air to flow across the biofilter module.

Preferably, the biofilter module comprises a main body adapted to house a growth medium and a vegetation on the growth medium, such that the vegetation is adapted to pass through the air outlet.

Preferably, the biofilter module is oriented in an upstanding direction such that the vegetation on the biofilter module is directed outwardly.

Preferably, the plenum is pivotally connected to the supporting frame around a horizontal axis or a vertical axis.

Preferably, the supporting frame comprises at least two poles.

Preferably, each pole will be spaced apart from one another with a distance less than 1.8 metre.

Preferably, the pole comprises a pivot means for removably attaching the plenum.

Preferably, the pole comprises a secure lock for securing the plenum from rotation Preferably, the supporting frame further comprises a receiving trough for receiving excess drainage.

Preferably, the supporting frame comprises electrical circuit for powering the impeller.

Preferably, the moveable ventilation system comprises an automatic irrigation system mounting on top of the supporting frame.

Preferably, the plenum comprises an open grill means to enable air to be drawn though the biofilter module by the impeller.

Preferably, the open grill means comprises a pair of cross bars for mounting the biofilter module.

Preferably, the poles of the supporting frame are made in channel section with receiving members positioned within the channel so that on rotation, the plenum secured to the poles.

Preferably, the poles comprising a sliding means adapted to allow plenums to slidable mounted on the supporting frame.

Preferably, the biofilter module is made of thermoformed, vacuum formed, or injection moulded from plastic material.

Preferably, the growth medium comprises mainly coconut fibre content supplemented with a liquid fertilizer.

Preferably, the biofilter module has a regular shaped profile, such as a rectangular shape, square shape, triangular shape, or circular shape.

Preferably, the vegetation or plant species may generally comprise one or more of: *Neomarica* species, *Philodendron* species, *Peperomia* species, *Nephrolepis* species, *Epipremnum aureum*, *Schefflera* species, *Chlorophytum comosum* and *Spathiphyllum* species.

Preferably, the biofilter module comprises a fluid inlet at a top surface of an upstanding biofilter module and a fluid outlet at a bottom surface of an upstanding biofilter module, such that liquid or fluid fertilizer are fed to the fluid inlet, passes through the growth medium, and drains out from the fluid outlet.

Preferably, the fluid inlet comprises a plurality of slots located at the top surface of an upstanding biofilter module, and the fluid outlet comprises a plurality of slots located at the bottom surface of the upstanding biofilter module.

Preferably, the moveable ventilation system further comprises a fabric layer of geotextile fabric arranged on the inner surface of the biofilter module, wherein the fabric layer of geotextile fabric covers the air outlet and retains the growth medium in the biofilter module.

Preferably, the inner surface of the biofilter module comprises a plurality of fingers.

Preferably, the biofilter module comprises a base and a cover defining a cavity for retaining the growth medium.

Preferably, the air inlet comprises a protrusion at the centre of the base, and the protrusion has one or more apertures around a side wall of the protrusion to direct the air flow across the base of the biofilter.

Preferably, the base comprises a connecting means for mounting the biofilter module to the plenum.

Preferably, the cross bars form an X-shaped profile.

Preferably, the base comprises a recess having the complimentary shape of the cross bars, and the recess is adapted to accommodating the cross bars when mounting the biofilter module to the plenum.

Preferably, the biofilter module is mounted on the plenum by securing the base to the cross bars with a fixing means, wherein the fixing means comprises any one or more of screws, nuts and bolts, insertion clips, and studs.

Preferably, the cross bars comprises a hole having a profile complementary to the shape of the protrusion such that the cross bars will not block the air flow from the impeller.

Preferably, the cover is adapted to be removably connected to the base with removable connectors comprising one or more of screws, nuts and bolts, insertion clips, studs.

Preferably, the cover 34 comprises a rim for measuring an amount of substrate material placed into the cavity of the biofilter module.

In another aspect of the present invention, there is provided a moveable ventilation system comprising
a supporting frame having at least one plenum,
at least one biofilter module mounted on the plenum for allowing air to flow through the biofilter module from an air inlet to an air outlet via a growth medium and a vegetation,
wherein the plenum is rotatably connected to the supporting frame.

Preferably, the air inlet has one or more apertures directing air to flow across the biofilter module.

In yet another aspect of the present invention, there is provided a biofilter module comprising
an air inlet, and an air outlet;
a growth medium and vegetation housing in a cavity;
wherein the air inlet comprises one or more apertures directing air to flow across the growth medium and vegetation.

Preferably, the biofilter module further comprises a cover and a base defining the cavity.

Preferably, the air inlet comprises a protrusion extending vertically from the base, wherein the apertures are located on the protrusion.

Preferably, the base comprises a plurality of projections extending thereon for directing air flow.

BRIEF DESCRIPTION OF THE FIGURES

Features and advantages of the present invention will become apparent from the following description of embodiments thereof, by way of example only, with reference to the accompanying drawings, in which.

DESCRIPTION OF THE INVENTION

Figure 1:
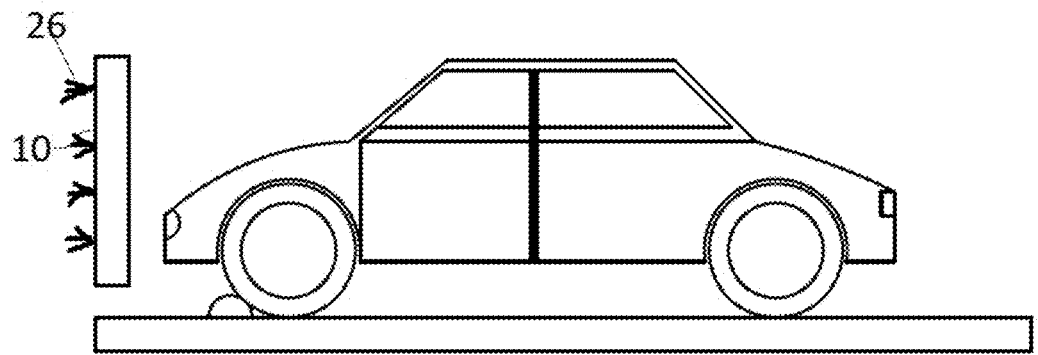
FIG. 1 shows a schematic perspective view of a moveable ventilation system of an embodiment of the present invention.
Figure 6:
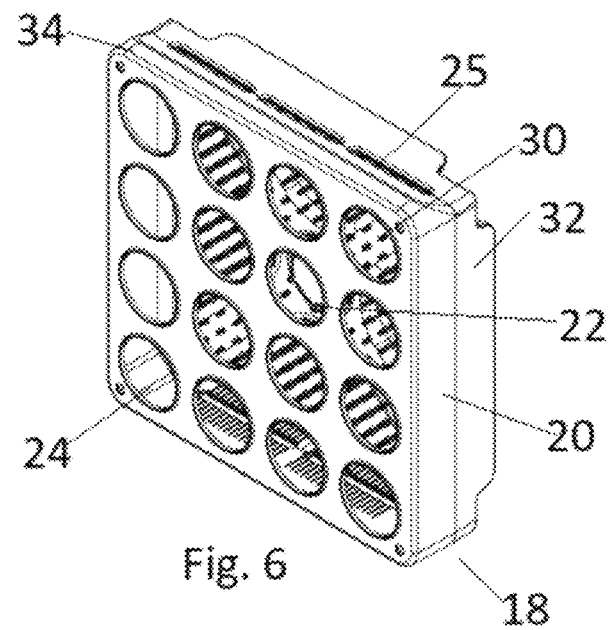
FIG. 6 shows a schematic perspective view of a biofilter module of the moveable ventilation system of FIG. 1.
Figure 7:
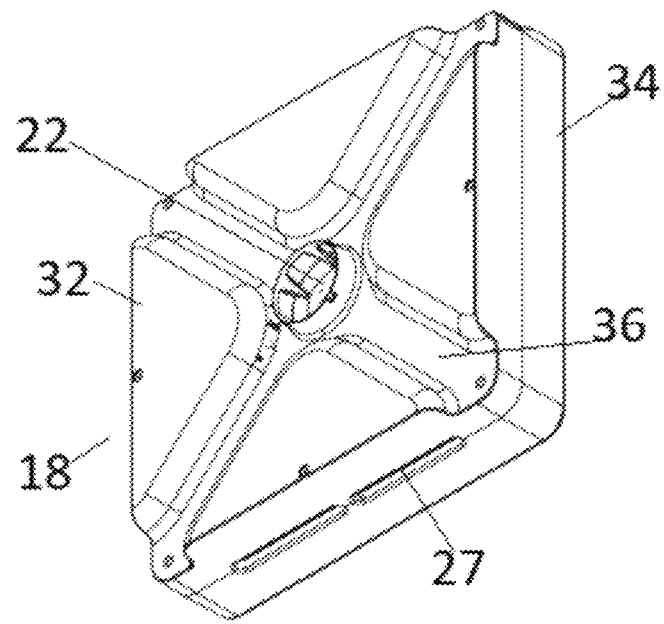
FIG. 7 shows another schematic perspective view of the biofilter module of FIG. 6.
Figure 8:
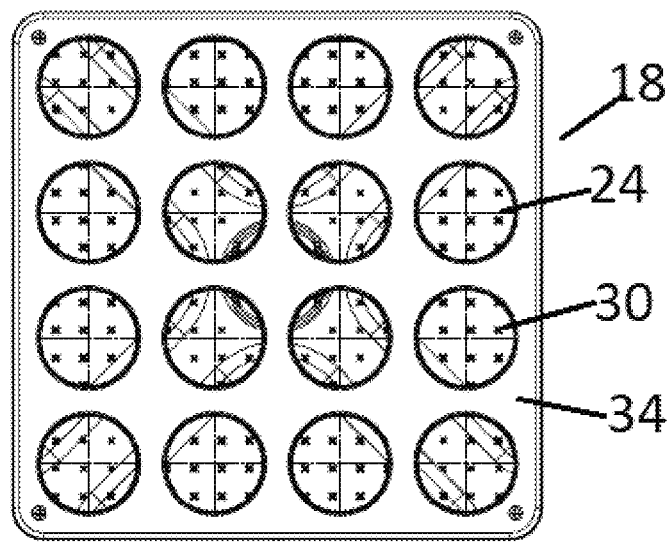
FIG. 8 shows a schematic front view of the biofilter module of FIG. 6.
Figure 9:
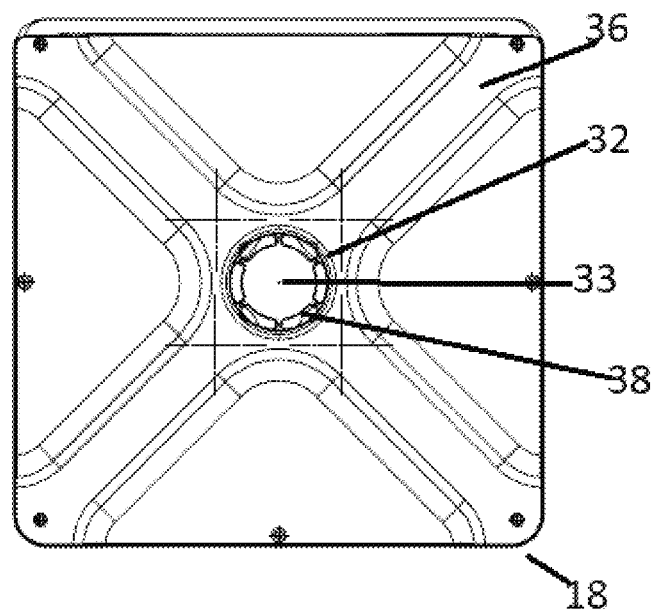
FIG. 9 shows a schematic back view of the biofilter module of FIG. 6.
Figure 10:
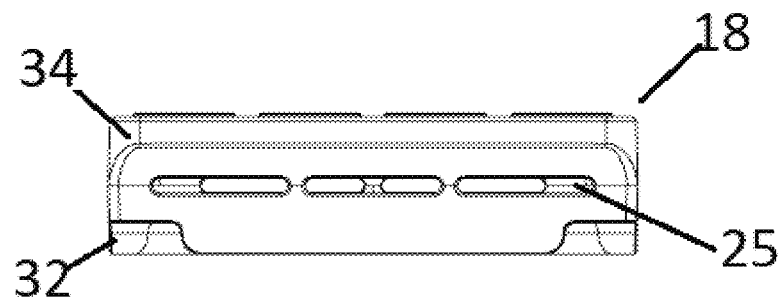
FIG. 10 shows a schematic top view of the biofilter module of FIG. 6.
Figure 11:
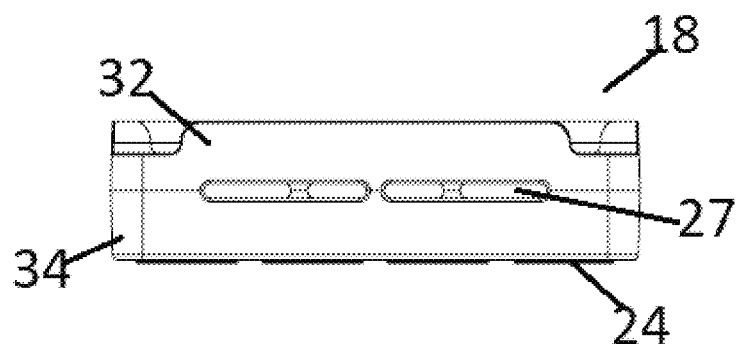
FIG. 11 shows a schematic bottom view of the biofilter module of FIG. 6.
Figure 12:
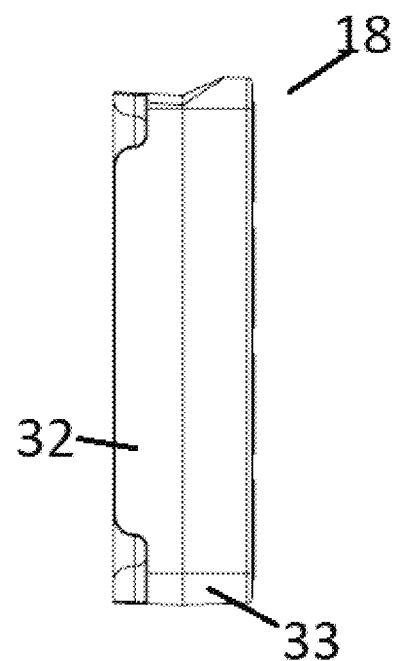
FIG. 12 shows a schematic side view of the biofilter module of FIG. 6.

Reference is now made to FIG. 1 to FIG. 18 showing a preferred embodiment of the present invention. FIG. 1 shows a schematic side view of a moveable ventilation system an embodiment of the present invention. The moveable ventilation system 10 comprises a supporting frame 12 having one or more plenum 14. Each plenum 14 has one or more biofilter modules 18 mounted thereon. The plenum 14 comprises an impeller for driving airflow through biofilter module 10 from an air inlet 22 to an air outlet 24 via a growth or substrate medium shown in FIG. 6. The air inlet 22 has one or more apertures directing air flow across the biofilter module 10. In another embodiment, the plenum 14 does not have any impeller.

The biofilter module 18 as shown in FIG. 6 to FIG. 12 comprises a main body 20 having an air inlet 22 and an air outlet 24. The main body 20 is adapted to retain growth medium and vegetation is then planted in the growth medium 26 via the air outlet 24.

Figure 2:
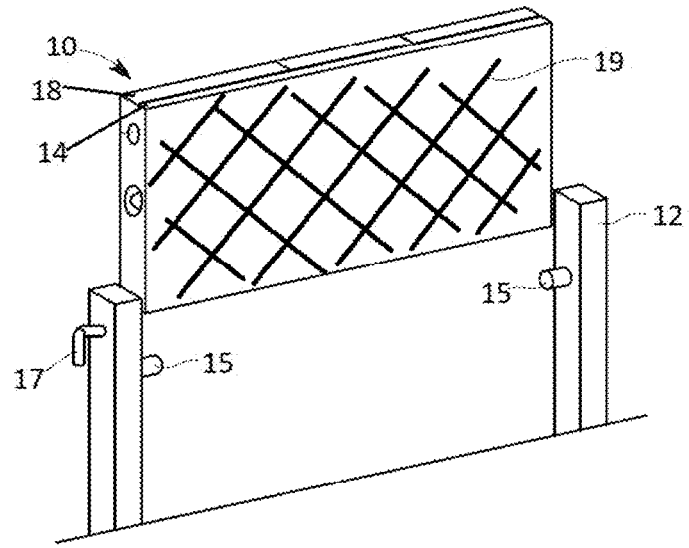
FIG. 2 shows another schematic perspective view of the moveable ventilation system of FIG. 1.
Figure 17:
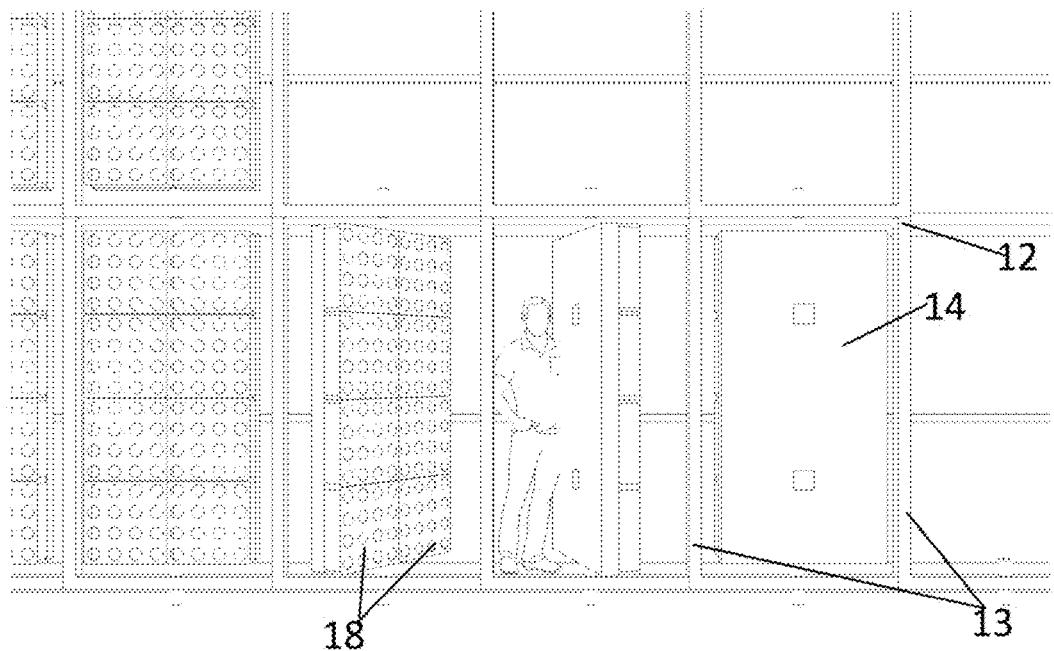
FIG. 17 shows a schematic perspective view of a moveable ventilation system of another embodiment of the present invention.
Figure 18:
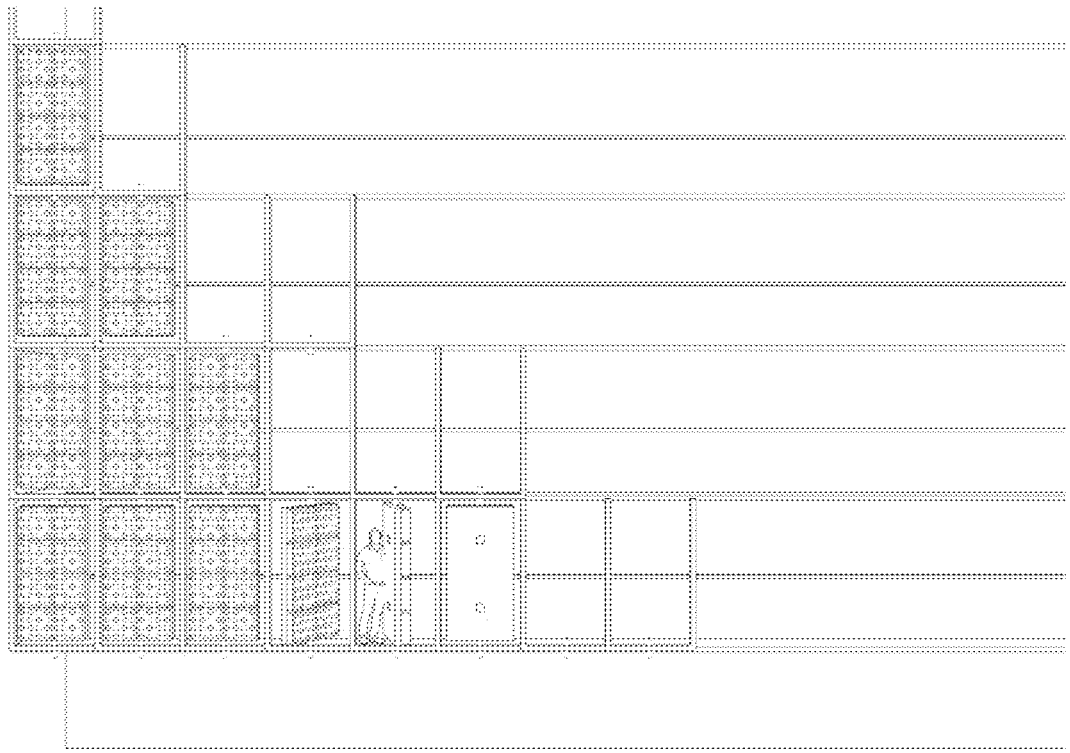
FIG. 18 shows another schematic perspective view of the ventilation system of FIG. 17.

In one embodiment the ventilation system 10 forms an upstanding plant wall wherein the vegetation on the biofilter module 18 is directed outwardly. Preferably, the plenum 14 is pivotally connected to the supporting frame 12. In one embodiment, the plenum 14 is pivotal around a horizontal axis as shown in FIG. 2. In another embodiment, the plenum 14 is pivotal around a vertical axis as shown in FIG. 17 and FIG. 18. The ventilation system 10 is installed as an outer wall of a building, wherein the vegetation is facing outside of the building for sunlight. The prior art vertical plant walls are difficult to maintain. Any repair or replacement requires working from the outside of a tall building. The present embodiment provides a pivotal mechanism such that the plenum 14 can be rotated inwardly to allow maintenance from the inside of the building. In another embodiment, ventilation system 10 is installed as an inner wall or partition of a building, wherein the ventilation system has a lighting system to provide suitable light source for the vegetation to grow thereon.

In one embodiment, the supporting frame 12 comprises at least two poles 13 made of relatively strong and weight bearing material such as metal, steel or aluminium. Each pole will be less than 1.8 metre apart from one another. This embodiment is adapted to provide an arrangement of a ventilation system 10 in a car park. Preferably, the distance between each pole may be such that it prevents the accidental egress by motor vehicle positioned near or proximal to the supporting frame wherein the system is installed in a car park. The support frame is replacing the need for traditional crash barriers that are usually installed in car parks.

It can be seen or understood by a person skilled in the art that access to the said plants may be difficult for the purpose of replanting or maintenance but this configuration is ideal for applications that may be best presented for cleaning exhaust fumes from vehicles whether cars are parked inwards towards the said wall garden or reverse parked in either case exhaust fume concentration in said car parks is extreme and any means to improve air quality will have significant environmental benefits.

In order to overcome this situation, an embodiment of the invention described herein provided a ventilation system 10, wherein the plenum 14 with the biofilter module 18 can be re-orientated for maintenance with said reorientation being achieved by any of a number of means.

In one embodiment, the pole 13 comprises a pivot stud axel 15 for removably attaching the plenum 14. In one embodiment, the pole 13 comprises a secure lock 17 for securing the plenum from rotation. In one embodiment, the supporting frame 12 further comprises a bottom stand. In the embodiment, the bottom stand comprises a receiving trough for receiving excess drainage and redirect the drainage to a recycling system. In another embodiment, the supporting frame 12 comprises electrical circuit for powering the impeller. In another embodiment, the electrical circuit comprises a battery or other power source connected to a controller and at least one fan. In yet another embodiment, the supporting frame 12 comprises solar panels to charge the aforementioned battery or act as a power source. The solar panels can provide the power source for supporting the electrical impeller.

In another embodiment, the ventilation system 10 comprises an automatic irrigation system mounting on top of the supporting frame 12. The irrigation system comprises a pump for pumping fluid from a tank to the top of the support frame 12 which comprises a channel for delivering fluid to the biofilter module 18 from the fluid inlet 25. Excess fluid can be drained through the fluid outlet 27. The drainage may either be fed to another biofilter module 18 below, or the receiving tough. The receiving tough is adapted to receive excess fluid and store in a tank. The tank can be accessed through an opening where fluid samples can be taken for testing.

When passing water through the growing medium, it was noted that water was tracking to the centre of the module at the drainage outlet in the bottom. In one of the preferred embodiment, the biofilter module 18 comprises a series of baffles in the bottom to direct the flow along the length of the drainage opening In the case of maintenance requirements the plenum 14 can be rotated through 180 degrees to allow ready access to the biofilter module 18 from within the building. As shown in FIG. 2, the plenum comprises an open grill means to enable exhaust fumes to be drawing though the said plant matter by electric impeller so placed within the plenum 14. In one embodiment, the open grill means comprises a pair of cross bars 19 for supporting the biofilter module 18.

In one embodiment, the ventilation system 10 comprises a controller for controlling the rotation of the plenum 14. The controller is connected to a solar sensor to detect the optimal direction of the plenum 14 such that the vegetation on the biofilter module 18 can receiving an optimal amount of sun light.

In one preferred embodiment, the ventilation system 10 has a fixed plenum 14 on the supporting frame 12. The ventilation system 10 of an embodiment may be difficult to install without the pivotal plenum 14 in certain applications, such as an external wall of a building. In one embodiment, the stud axels 15 are inserted through receiving holes into the plenum 14 and the entire assembly being placed in position on the building floor and the upstanding poles 13 are then fastened to the floor.

With the shown arrangement the said plenum can be locked into the vertical position with a spring loaded and perhaps lockable secure lock 17 configured to engage with a receiving hole on the side of the plenum.

In yet another embodiment the said upstanding metal poles 13 with the stud axels 15 are first installed by fastening to the floor of the said car park and the said plenum is lowered into position with half cylindrical or flat bar receiving members projecting from the sides of the said metal frames configured to engage with the said stud axels 15 so that in this case it can be seen that installation is made more simple as the components can be separately installed and the said metal frame later placed into position.

Figure 3:
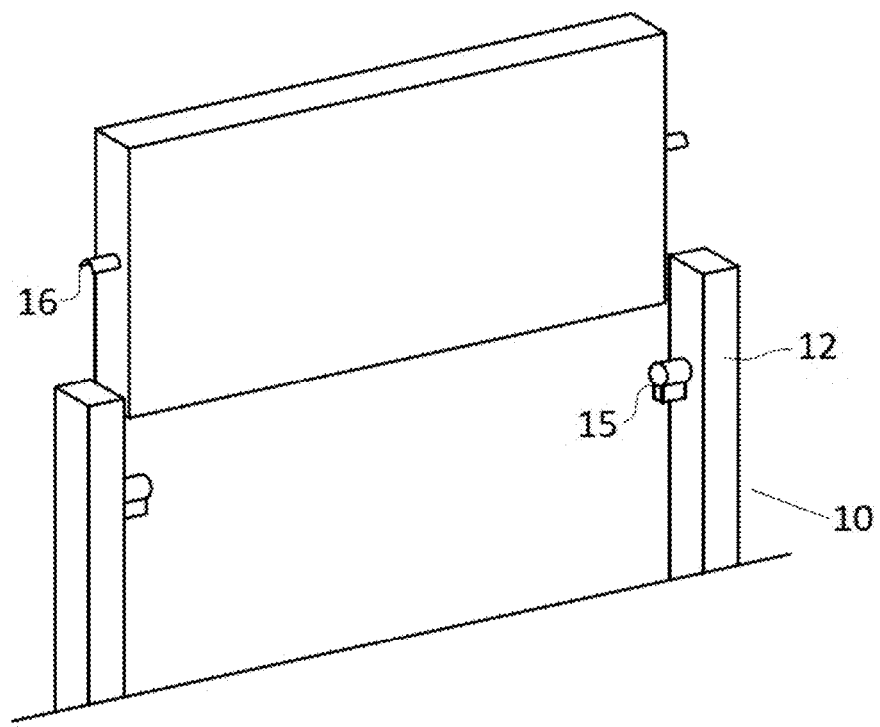
FIG. 3 shows another schematic perspective view of the moveable ventilation system of FIG. 1.

FIG. 3 shows this arrangement with the said upstanding metal poles 13 and the said half cylindrical receiving members on the side of the plenum 14.

It can readily be seen that in the later embodiment that if the plenum 14 is rotated beyond 90 degrees the half cylindrical receiving members 16 may likely disengage from the said stud axels 15 as shown in FIG. 3. This problem has can be overcome by the inclusion of stops on the plenum 14 to prevent rotation beyond 90 degrees. This stops can be configured in a number of ways, in one embodiment, the stops are projections on the stud axels 15 which are located on the underside of the said stud axels to prevent rotation of the said metal frame beyond 90 degrees.

Figure 4:
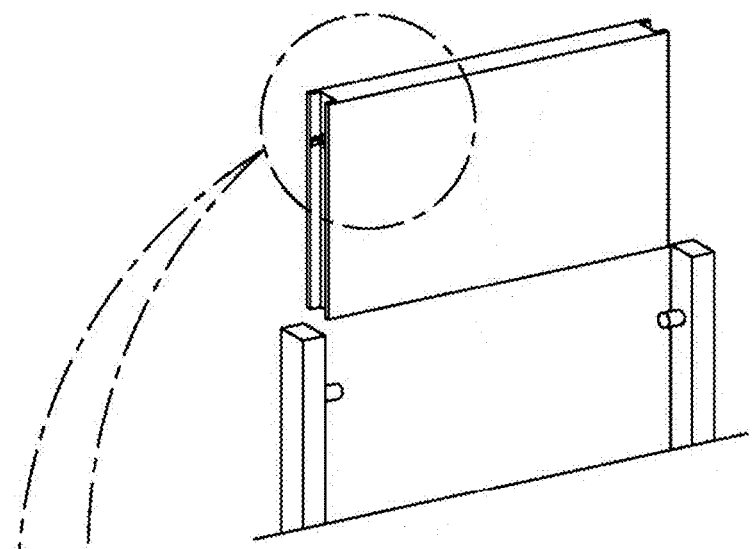
FIG. 4 shows another schematic perspective view of the moveable ventilation system of FIG. 1.
Figure 5:
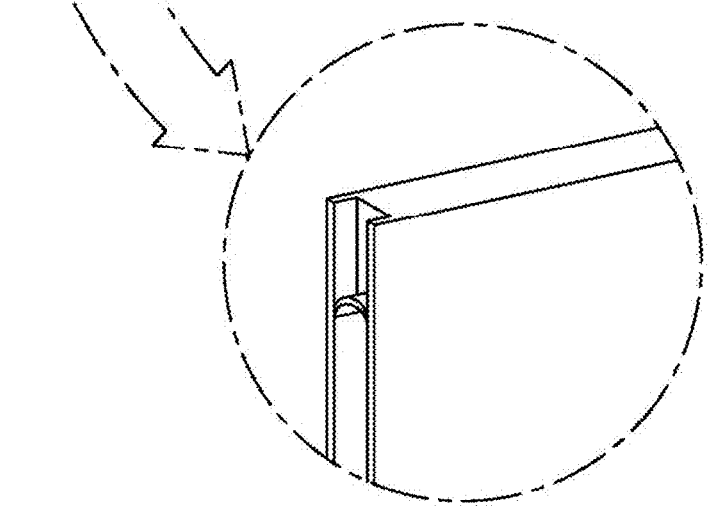
FIG. 5 shows a schematic perspective region view of a plenum of the moveable ventilation system of FIG. 1.

In yet another arrangement and the preferred embodiments, the poles 13 of the supporting frame 12 are made in channel section with the said half cylindrical receiving members positioned within the channel so that on rotation to 90 degrees and even more the plenum 14 cannot disengage from the said stud axels 15. However, in this configuration, it will be possible to slide the supporting frame 12 with a sliding means. This configuration is shown in FIG. 4 and an enlargement of the said half cylindrical engagement means shown in FIG. 5.

With this configuration it can be seen that installation is much simplified and maintenance of the plant matter is easily undertaken by re-orientating the plenum 14 of the ventilation system 10 to a position to make it easy for maintenance personnel.

In one embodiment, the material construction of the biofilter module 18 comprises plastic. The biofilter module 18 is typically thermoformed, vacuum formed or injection moulded from recycled or virgin plastic material. As such, the biofilter module 18 can provide a flexible design to allow use on non linear surfaces. The biofilter module 18 can also be integrated onto sides of planter boxes, curtain wall panels, garden walls, or other external building structures. The ventilation system 10 of an embodiment of the present invention can be adapted to be connected to a HVAC system or even replacing an HVAC system. The growth medium and the vegetation can effectively reduce pollutant in the air, produce fresh air, keep consistent temperature and humidity.

In one embodiment, the growth medium and vegetation is adapted to filter pollutant in the water such that the ventilation system 10 can be used for cleaning or filtering water.

In one embodiment, the ventilation system 10 can be used for cleaning air in a confined space such as tunnels or submarines with vegetation growing under the an artificial light source of the ventilation system. The ventilation system 10 can also be used in a space or extraterrestrial missions.

In one embodiment, the growth medium comprises an activated charcoal primary filter, such as coconut fibre content, supplemented with a liquid fertilizer. Preferably, the biofilter module 18 has a regular shape, such as a rectangular shape, square shape, triangular shape, or circular shape. In one embodiment, the dimensions of each biofilter module 18 are 100 mm to 5000 $mm^2$ and 10 to 500 mm deep. Preferably, each biofilter module 18 measures 500 mm×500 mm×130 mm, and holds 8-16 plants in circular compartments. The plenum 14 has electric axial impellers which, when activated, provides a uniform air flow through the growing medium and plants at a rate of up to 7 litres per second. The biofilter modules 18 are irrigated via drip line irrigation, minimising water wastage The moveable ventilation system 10 is typically designed to be assembled from stacked square biofilter modules 18 usually held in place by a supporting frame 12 typically of metal construction or a backing wall. In one embodiment, the biofilter modules 18 are fastened to the backing wall. Preferably, the biofilter modules 18 are made from rigid plastic. In one embodiment, the biofilter modules 18 are one half meter square and 130 millimetres in depth with a plurality of regularly placed planting holes (i.e. the air inlet 24) of typically 75 mm diameter. The planting holes or air inlets 24 are uniformly displaced over the front area of the square biofilter modules 18.

In one preferred embodiment, the biofilter module 18 comprises sixteen air outlets 24. Each of the air outlet 24 provides an outlet for a plant grown horizontally therethrough. Typically, only eight or twelve of the sixteen air outlets are used for plant growing and the rest of the air outlet will be covered by growth medium. In one embodiment, the plenum 14 comprises an electric axial impeller which, when activated, provides a uniform flow of air up through the growth medium and past the plant leaves, at a rate of 3.5 m/s at full velocity (measured detached from the modules). Preferably, the vegetation or plants may comprise one or more or a combination thereof: *Neomarica* species, *Philodendron* species, *Peperomia* species, *Nephrolepis* species, *Epipremnum aureum, Schefflera* species, *Chlorophytum comosum* and *Spathiphyllum* species.

In one embodiment, the biofilter module 18 comprises a fluid inlet 25 at a top surface and a fluid outlet 27 at a bottom surface. The water or fluid fertilizer are fed to the fluid inlet 25, passes through the growth medium 26, and drains out from the fluid outlet 27. The water or fluid fertilizer may be then fed to another biofilter module 18. Finally, the drained fluid is collected by the receiving trough of the supporting frame 12. In one preferred embodiment, the fluid inlet 25 comprises of a plurality of slots (e.g. three slots) located at the top surface of the upstanding biofilter module 18, and the fluid outlet 27 comprises a plurality of slots (e.g. two slots) located at the bottom surface of the upstanding biofilter module 18.

In one embodiment, a fabric layer 28 of geotextile fabric is arranged on the inner surface of the biofilter module 18, covering the air outlet 24 and retaining the growth medium 26 in the biofilter module 18. Preferably, the inner surface of the biofilter module 12 comprises a plurality of hooks for mounting the fabric layer 28 to prevent the growth medium 26 and the fabric layer 28 from moving around such that the fabric layer 28 can maintain its shape. In one embodiment, the hooks on the inner surface is implement as fingers 30. This also creates internal plenums within the biofilter module 18 to distribute the air more evenly through the growth medium.

In one embodiment, the biofilter module 18 comprises a base 32 and a cover 34 defining a cavity for retaining the growth medium 26.

Figure 19:
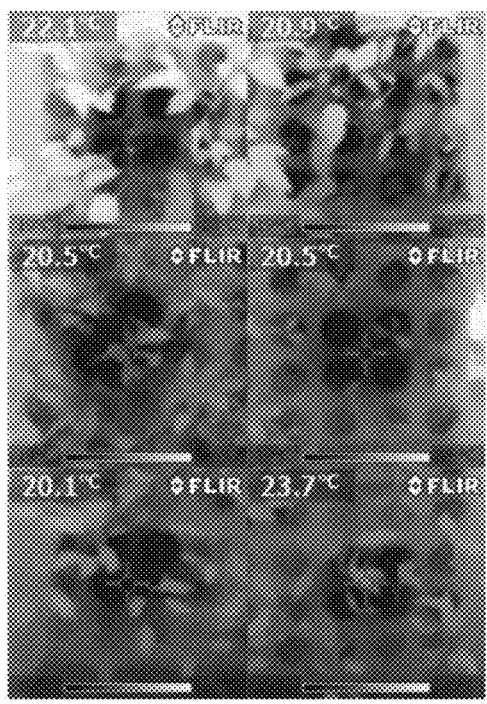
FIG. 19 shows a picture capture with an infrared camera to show the movement of air of a biofilter module having a first type of air inlet.

In one embodiment, the base 32 comprises air inlet 22 with an aperture on a plane substantially parallel to the plane of the base. Such aperture will direct air to flow directly toward the air outlet 24 through the growth medium 26. FIG. 19 shows all air is moving in dark grey. Such design will have the air delivered centrally rather than uniformly across the base 32.

Figure 20:
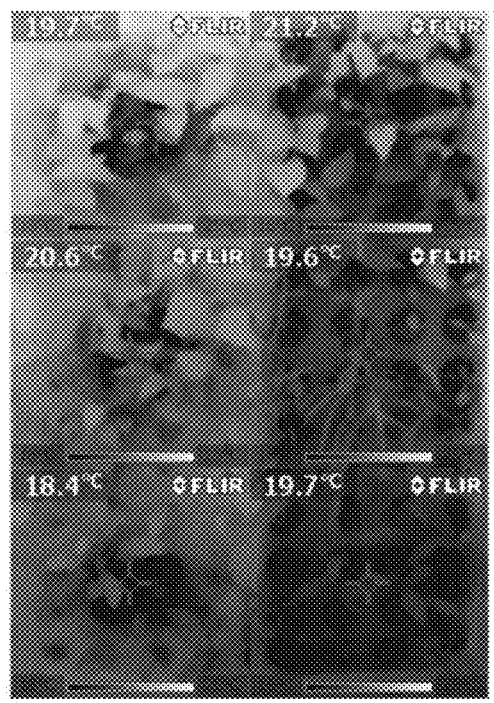
FIG. 20 shows a picture capture with an infrared camera to show the movement of air of a biofilter module having a second type of air inlet.

In another embodiment of the present invention, the base 32 comprise an air inlet 22. In one embodiment, the air inlet 22 is a protrusion 33 at the centre of the base 32, wherein the protrusion 33 comprises one or more apertures 38 around the side wall of the protrusion to direct the air flow across the base 32 (i.e. spreading across the plane parallel to the base 32) of the biofilter module 18. FIG. 20 shows where air is moving inside the biofilter module 18. Such designs or configurations will have the air delivered uniformly across the base 32.

In one embodiment of the present invention, the bases 32 comprises a connecting means for mounting the biofilter module 18 to the plenum 14. In one embodiment, the plenum 14 comprises an open grill means for mounting the biofilter module 18 thereon. The open grill means is implemented in the form of a pair of cross bars 19. The cross bars 19 forms an X-shaped profile. In another embodiment, the cross bars 19 forms an H-shaped profile, Y-shaped profile, or Z-shaped profile, etc.

In one embodiment, the cross bars 19 comprises a hollow body for allowing air flow therethrough. The arms of the cross bars 19 comprises one or more aperture to deliver pressure air to the biofilter module 18 mounted thereon. However, such embodiment, requires a very strong impeller as the hollow body of the cross bars 19 reduce the volume of the air flow into the biofilter module 18 mounted thereon.

Figure 13:
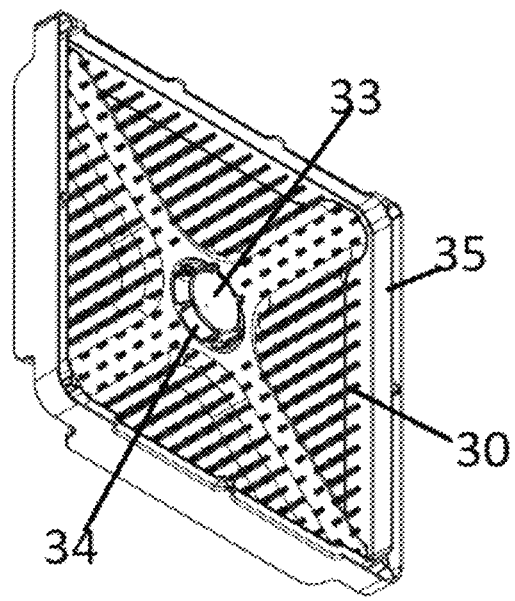
FIG. 13 shows a schematic perspective view of a base of the biofilter module of FIG. 6.
Figure 14:
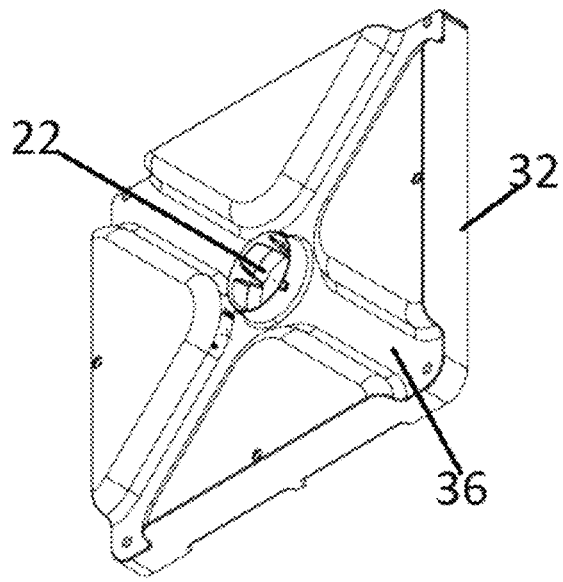
FIG. 14 shows another schematic perspective view of a base of the biofilter module of FIG. 6.
Figure 21:
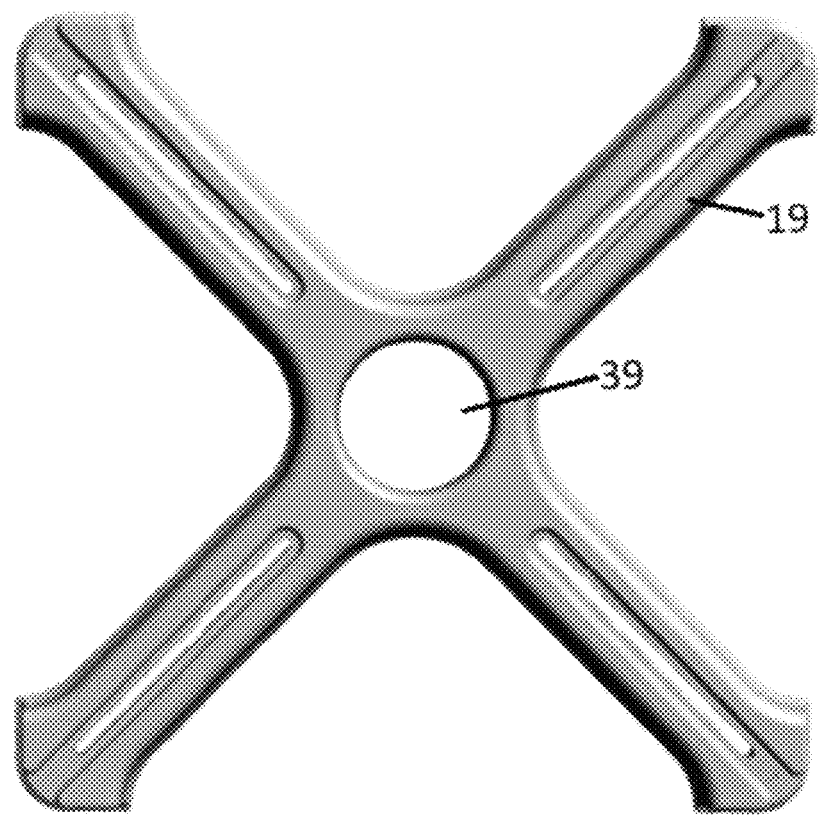
FIG. 21 shows a schematic perspective view of cross bars.

Reference is now made to FIG. 13 and FIG. 14 which show the schematic perspective view of a base 32 of an embodiment of the present invention. The base 32 comprises a recess 36 having the shape complimentary shape of the cross bars 19. The recess 36 is adapted to accommodating the cross bars 19 when mounting the biofilter module 18 to the plenum 14. In one embodiment, the biofilter module 18 is mounted on the plenum by securing the base 32 to the cross bars 19 with a fixing means such as screws, nuts and bolts, insertion clips, studs, etc. As shown in FIG. 21, the cross bars 19 has a hole 39 having a profile complementary to the shape of the protrusion 33 such that the cross bars will not block the air flow from the impeller.

Figure 15:
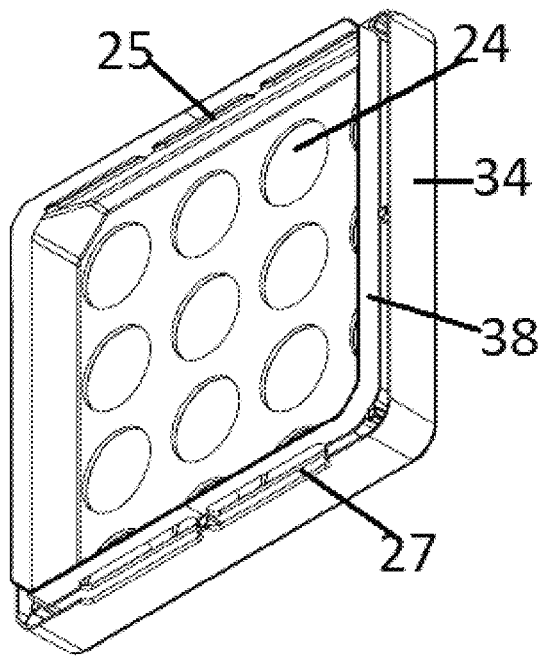
FIG. 15 shows a schematic perspective view of a cover of the biofilter module of FIG. 6.
Figure 16:
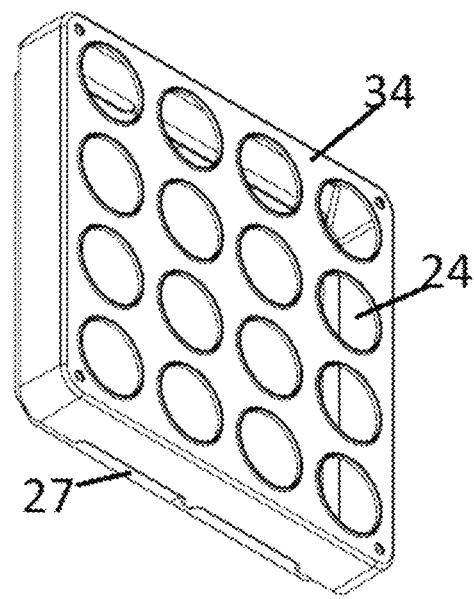
FIG. 16 shows another schematic perspective view of a cover of the biofilter module of FIG. 6.

Reference is now made to FIG. 15 and FIG. 16. In one embodiment, the cover 34 of the biofilter module 18 comprises a plurality of apertures functioning as the air outlet 24. Preferably, the air outlet 24 has a circular profile for allowing vegetation to grow therethrough. The cover 34 is adapted to be removably connected to the base 32 for defining a cavity for housing the growth medium 26. The base 32 and the cover 34 can be connect by different removable connectors, such as screws, nuts and bolts, insertion clips, studs, etc. When the base 32 and the cover 34 is connected to each other to form an upstanding biofilter module 18, the top surface has one or more slots formed for feeding fluid into the cavity of the biofilter module 18. At the same time, the bottom surface has one or more slots formed for draining excess fluid out of the cavity. In one embodiment, the cover 34 comprises a rim 38 for measuring an amount of material, such as growth medium 26, placed into the cavity of the biofilter module 18. The growth medium 26 is adapted to stop air leaking at the edge of the biofilter module 18.

In one embodiment, there is provided a method of assembling the biofilter module 18. The method comprising the step of laying a fabric layer 28 of geotextile fabric on the cover 34 such that the fabric layer of geotextile fabric covers all the air outlets 24 on the cover. Then vegetation is placed on the cover such that the vegetation is oriented upside down with the vegetation passing through the air outlets 24 and the roots substantially remain inside. Depending on the size and type of vegetation, the fabric layer 28 of geotextile fabric may be cut open to allow the leaves of the vegetation to pass through. Then growth medium 26 is used for filling up the space inside the cover 34. The rim 38 of the cover 34 is adapted to show how much growth materials are places on the cover 34. Once the cover 34 is filled, the fabric layer 28 of geotextile fabric is folded to cover the growth medium 26. The base 32 is then connected to the cover 34 as shown in FIG. 6 to FIG. 12.

The plurality of fingers 30 on the base 32 will hook onto the fabric layer 28 to prevent the growth medium 26 and the fabric layer 28 from moving around such that the fabric layer 28 can maintain its shape. These fingers 30 also keep the growth medium off the back of the module to enable air to be distributed evenly through the growth medium.

In one embodiment of the present invention, there is provided a moveable ventilation system 10. The system consisted of one or more biofilter module with 16 holes on the front face from which vegetation grows. In one preferred embodiment, the biofilter module 18 is made of polyethylene. Airflow enters the ventilation system 10 via an electric axial impeller that draws air through the rear of the biofilter module 18. The air firstly enters an open plenum 14 where the airflow is dispersed evenly across the biofilter module 18, before flowing through the 85 mm deep substrate and returning to the environment through the planted surface. Plant species are grown in the vertical alignment. Typically, plants are established within the module for more than 3 months. Biofilter modules 18 are adapted to allow irrigation to field capacity.

Whilst it is known that the plant growth substrate in active biofilter modules 18 can act as a filter medium, it was previously not known whether the botanic component of the present embodiments played a function in particulate matter (PM) filtration. Despite differences in single pass removal efficiency across treatments, the moveable ventilation system 10 of the present invention containing plants can effectively reduce PM across all different species, and thus would contribute to improved air quality if used in situ. Fern species recorded the highest removal efficiencies across all measured particle sizes (*Nephrolepis exaltata bostoniensis* single pass remove efficiency (SPRE) for $PM_{5-10}$=92.46%). An assessment of plant morphological data suggested that the root structure of the plants strongly influenced removal efficiency, the likely mechanism for which is the roots creating a filter themselves, and/or root induced substrate alteration. The moveable ventilation system 10 of the present invention has the potential to enhance active botanical biofiltration technology with appropriate plant species selection, with the percentage of PM filtered from a polluted air stream higher than that of many common heating, ventilation and air conditioning (HVAC) filter media.

The filtration capacity of the moveable ventilation system 10 of the present invention also depends on different substrate types, and the addition of a material with known volatile organic compounds (VOC) absorbent properties. In an embodiment of the present invention, the moveable ventilation system 10 has the ability to remove PM, benzene, ethyl acetate and ambient total VOCs. The moveable ventilation system's capacity to filter out VOCs was increased from 34.5% to 60.24%, nearly doubling its efficiency. This improvement marks a major step forward in air cleaning technology, as most existing filters simply remove suspended particles and cannot filter out VOCs.

The moveable ventilation system 10 has the ability to remove VOCs and PMs and modulate temperature and humidity make the present invention superior to most non-biological systems as general air quality maintenance devices.

The moveable ventilation system 10 of the present invention can also provide acoustic benefits. The moveable ventilation system 10 allows easy adjustment to the density of the soil substrate and plant matters to change the audio absorption coefficient. Additionally, the shape of foliage and the ratio between rigid and non-rigid plant matter are incorporated into the design of the present invention to determine the greatest effect on the scattering coefficient.

In one embodiment, the ventilation system 10 comprises lighting system installed at the supporting frame 12 for assisting vegetation grow. In one embodiment, the lighting system comprises one or more LED light source. The lighting system is particular useful when the ventilation system is installed in an indoor environment.

In another embodiment, the ventilation system 10 comprises a sensor system for detailing the air quality, $CO_2$ level, temperate of the biofilter module 18. The sensor system will monitor the status of each biofilter module 18 and send the data to a remote system for analysis. The sensor module is also adapted to send notification for replacing or repairing a biofilter module 18. Each biofilter module 18 may comprises matrix barcode or Radio-frequency identification for identifying the particular biofilter module 18. In one embodiment, the ventilation system 10 comprises sensor and controller to automatically turning on and off the electrical impeller, lighting, and irrigation system. The sensor and controller may also have an integrated sounds, smells, and other tactile responses into ventilation system 10 for connection with nature experience.

In one embodiment, the ventilation system 10 comprises internal plenum baffle arrangement. In another embodiment, the plenum 14 is a circular column that acts as support and rotation.

It is understood that those persons skilled in the art that variations may be made in core teachings of this invention.

Although the invention has been described with reference to specific examples, it will be appreciated by those skilled in the art that the invention may be embodied in many other forms, in keeping with the broad principles and the spirit of the invention described herein.

The present invention and the described embodiments specifically include the best method known to the applicant of performing the invention. The present invention and the described preferred embodiments specifically include at least one feature that is industrial applicable.

The invention claimed is:

1. A moveable ventilation system comprising a supporting frame having at least one plenum,
   at least one biofilter module mounted on the plenum;
   an impeller in the plenum for driving air through the biofilter module from an air inlet to an air outlet via a growth medium and a vegetation,
   wherein the air inlet has one or more apertures directing air to flow across the biofilter module; and wherein the plenum comprises an open grill to enable air to be drawn though the biofilter module by the impeller, wherein the open grill comprises at least one cross bar for mounting the biofilter module.

2. The moveable ventilation system of claim 1, wherein the biofilter module comprises a main body adapted to house the growth medium and the vegetation on the growth medium, such that the vegetation is adapted to pass through the air outlet.

3. The moveable ventilation system of claim 2, wherein the biofilter module is oriented in an upstanding direction such that the vegetation on the biofilter module is directed outwardly.

4. The moveable ventilation system of claim 1, wherein the plenum is pivotally connected to the supporting frame around a horizontal axis or a vertical axis.

5. The moveable ventilation system of claim 1, wherein the supporting frame comprises at least two poles.

6. The moveable ventilation system of claim 5, wherein each pole will be spaced apart from one another with a distance less than 1.8 metre.

7. The moveable ventilation system of claim 6, wherein the pole comprises a pivot means for removably attaching the plenum.

8. The moveable ventilation system of claim 6, wherein the pole comprises a secure lock for securing the plenum from rotation.

9. The moveable ventilation system of claim 6, wherein the supporting frame further comprises a receiving trough for receiving excess drainage.

10. The moveable ventilation system of claim 1, wherein the supporting frame comprises electrical circuit for powering the impeller.

11. The moveable ventilation system of claim 1, further comprising an automatic irrigation system mounting on top of the supporting frame.

12. The moveable ventilation system of claim 1, wherein the plenum is rotatably connected to the supporting frame.

13. The moveable ventilation system of claim 1, wherein at least one cross bar is a pair of cross bars.

14. The moveable ventilation system of claim 6, wherein the poles of the supporting frame are made in channel section with receiving members positioned within the channel so that on rotation, the plenum secured to the poles.

15. The moveable ventilation system of claim 6, wherein the poles comprising a sliding means adapted to allow plenums to slidable mounted on the supporting frame.

16. The moveable ventilation system of claim 1, wherein the biofilter module is made of thermoformed, vacuum formed, or injection moulded from plastic material.

17. The moveable ventilation system of claim 1, wherein the growth medium comprises mainly coconut fibre content supplemented with a liquid fertilizer.

18. The moveable ventilation system of claim 1, wherein the biofilter module has a regular shaped profile, such as a rectangular shape, square shape, triangular shape, or circular shape.

19. The moveable ventilation system of claim 1, wherein the vegetation comprises one or more of: *Neomarica* species, *Philodendron* species, *Peperomia* species, *Nephrolepis* species, *Epipremnum aureum, Schefflera* species, *Chlorophytum comosum* and *Spathiphyllum* species.

20. The moveable ventilation system of claim 1, wherein the biofilter module comprises a fluid inlet at a top surface of an upstanding biofilter module and a fluid outlet at a bottom surface of an upstanding biofilter module, such that liquid or fluid fertilizer are fed to the fluid inlet, passes through the growth medium, and drains out from the fluid outlet.

21. The moveable ventilation system of claim 20, wherein the fluid inlet comprises a plurality of slots located at the top surface of an upstanding biofilter module, and the fluid outlet comprises a plurality of slots located at the bottom surface of the upstanding biofilter module.

22. The moveable ventilation system of claim 1, further comprising a fabric layer of geotextile fabric arranged on an inner surface of the biofilter module, wherein the fabric layer of geotextile fabric covers the air outlet and retains the growth medium in the biofilter module.

23. The moveable ventilation system of claim 22, wherein the inner surface of the biofilter module comprises a plurality of fingers.

24. The moveable ventilation system of claim 1, wherein the biofilter module comprises a base and a cover defining a cavity for retaining the growth medium.

25. The moveable ventilation system of claim 24, wherein the air inlet comprises a protrusion at the centre of the base, and a protrusion has one or more apertures around a side wall of the protrusion to direct the air flow across the base of the biofilter.

26. The moveable ventilation system of claim 24, wherein the base comprises a connecting means for mounting the biofilter module to the plenum.

27. The moveable ventilation system of claim 13, wherein the pair of cross bars form a X-shaped profile.

28. The moveable ventilation system of claim 13, wherein a base of the biofilter module comprises a recess having the complimentary shape of the pair of cross bars, and the recess is adapted to accommodating the pair of cross bars when mounting the biofilter module to the plenum.

29. The moveable ventilation system of claim 28, wherein the biofilter module is mounted on the plenum by securing the base to the cross bars with a fixing means, wherein the fixing means comprises any one or more of screws, nuts and bolts, insertion clips, and studs.

30. The moveable ventilation system of claim 28, wherein the pair of cross bars comprises a hole having a profile complementary to the shape of a protrusion such that the pair of cross bars will not block the air flow from the impeller.

31. The moveable ventilation system of claim 24, wherein the cover is adapted to removably connected to the base with removeable connectors comprising one or more of screws, nuts and bolts, insertion clips, studs.

32. The moveable ventilation system of claim 24, wherein the cover comprises a rim for measuring an amount of material placed into the cavity of the biofilter module.

* * * * *